Dec. 1, 1925.  
A. F. OUELLET  
SAW  
Filed May 19, 1925
1,564,105
Fig. 1,
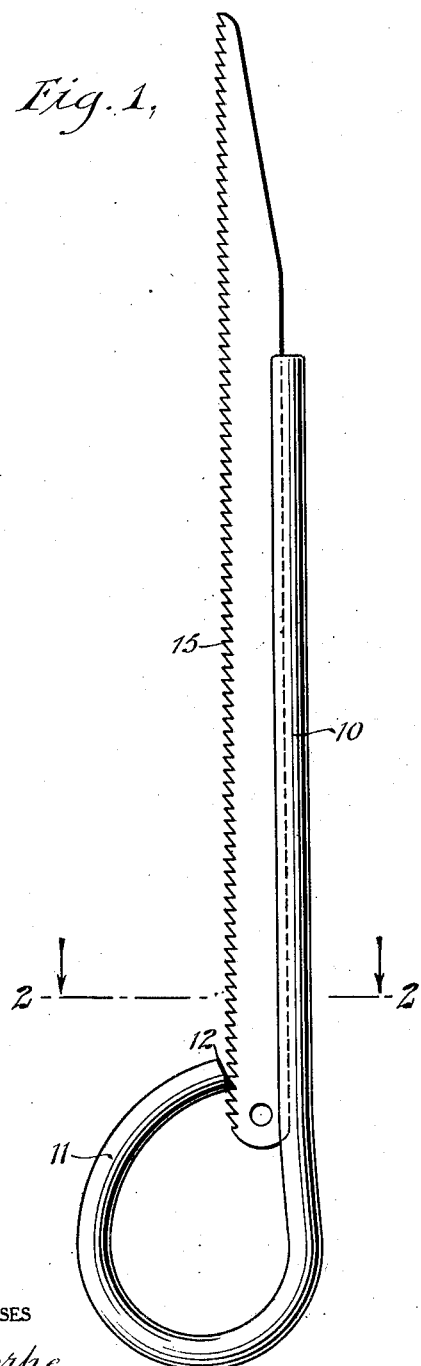
Fig. 2.
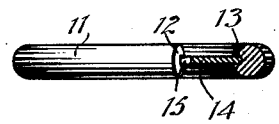
WITNESSES  
Edw. Thorpe  
Robert J. Hulsizer
INVENTOR  
A. F. Ouellet  
BY  
ATTORNEYS Patented Dec. 1, 1925.

1,564,105

UNITED STATES PATENT OFFICE.

ALBERT F. OUELLET, OF NEW YORK, N. Y.

SAW.

Application filed May 19, 1925. Serial No. 31,358.

To all whom it may concern:

Be it known that I, ALBERT F. OUELLET, a citizen of Canada, and a resident of the city of New York, borough of Manhattan, in the county and State of New York, have invented a new and Improved Saw, of which the following is a full, clear, and exact description.

This invention relates to a saw. The object of the invention is to provide a simple and efficient saw made of stock material and a minimum number of parts and capable of assembly and disassembly in the simplest possible manner.

The invention is illustrated in the drawings, of which—

Figure 1 is a side elevation; and

Figure 2 is a section on the line 2—2 of Fig. 1.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention comprises a single piece of material, such as a bar of metal, having one end bent over to form a handle, with the free end thereof disposed near the main body of the bar, said bar being provided with a slot to receive therein the back of a saw blade, the free end of the handle portion of the bar adapted to flexibly engage the teeth of the saw to hold the saw blade in this position. The saw blade is released by swinging the free end of the handle portion away from the teeth while the saw blade is being pulled out of the slot.

As shown in the drawings, the preferred form comprises a length of metal 10, preferably in the form of a bar, having one end bent up as at 11 to form a handle portion, the end 12 of this handle portion being bent over to lie near the main body portion of the bar 10. The bar 10 is provided, as shown in Fig. 2, with a slot 13 along its length, and in this slot the back of a saw blade 14, which may be a hack-saw, is adapted to be received. The handle portion 11, with its end 12 lying near the slot 13, acts as a sort of latch and engages the teeth 15 of the saw blade to hold the blade in the position shown in Fig. 1. By making the bar 10 of some strong metal, the handle portion 11 thereof can be slightly pulled away from the main body portion for the purpose of releasing the saw.

By reason of the slope of the saw teeth 15, it is apparent that to insert the blade in the device it is merely necessary to slide the blade into the slot 13 and as the teeth come in contact with the end 12 of the handle 11 the bevel of the teeth will engage the bevel on the end 12 of the handle 11, and by reason of the flexibility of the handle will move the end 12 aside to permit the saw to be moved in as far as desired. The opposite movement of the blade is prevented by the latching of the end of the handle with the teeth.

What I claim is:—

1. A saw construction, which comprises a piece of metal having one end bent over to form a handle, the end of the handle portion lying adjacent the main body portion of said piece, and a saw blade adapted to be received on the main body portion, the teeth of the saw blade near one end thereof adapted to be disposed in latched engagement with the end of the handle to hold the saw blade on the body portion.

2. A saw construction, which comprises a bar of metal having a slot throughout a substantial portion of its length, one end of the bar being bent over to form a handle, said handle being of springy material, the free end of the handle being disposed adjacent the main body of the bar, and a saw blade adapted to be received in said slot, the free end of the handle portion adapted to latch with the teeth of the blade to prevent the blade from being removed from the bar.

3. In combination, a bar of metal having a slot therein, and a saw blade having its rear edge lying in said slot, the end of said bar of metal being bent over to form a handle the free end of which latchingly engages the teeth of the blade to hold it in position.

ALBERT F. OUELLET.